March 8, 1938.  H. WARD ET AL  2,110,250

DETACHABLE SPOUT FOR SEALED CANS

Filed Aug. 15, 1936

Inventor
Harry Ward,
Rudolph E. Strom.

By Clarence A. O'Brien
Hyman Berman
Attorneys

Patented Mar. 8, 1938

2,110,250

UNITED STATES PATENT OFFICE 2,110,250

DETACHABLE SPOUT FOR SEALED CANS

Harry Ward and Rudolph E. Strom, Murphys, Calif.

Application August 15, 1936, Serial No. 96,292

2 Claims. (Cl. 221—23)

This invention relates to a detachable spout for sealed cans, and an object of the invention is to provide a spout attachment for use upon cans containing fluids such as evaporated milk and the like.

An object of the invention is to improve upon devices as now used for the purpose of tapping the can and providing a convenient means for pouring out its contents; and the invention together with its objects and advantages will be best understood from a study of the following description taken in connection with the accompanying drawing wherein:—

Figure 1:
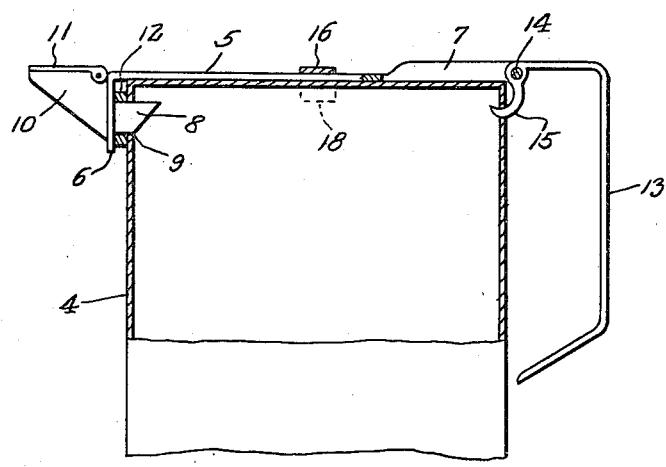
Figure 2:
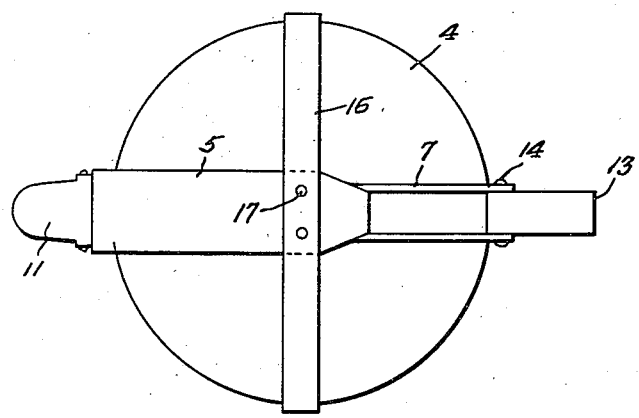

Figure 1 is a fragmentary sectional view through a can having the improved pouring attachment associated therewith, and Figure 2 is a top plan view illustrating the application of the pouring attachment.

Referring to the drawing by reference numerals it will be seen that the pouring attachment comprises a substantially flat bar 5 which at one end is down-turned at 6 and which at its opposite end is bifurcated and twisted at opposite sides of the furcations to provide a pair of spaced parallel, co-extensive arms or extensions 7.

The down-turned end 6 of the bar 5 is provided with an opening, and alined with this opening and extending from one side of the down-turned end 6 is a tubular cutting member 8. The member 8 at one end is welded or otherwise secured to the end 6 of bar 5 and at its free end the member 8 is cut off at an acute angle with respect to the axis of the tube to present a sharp edge so that the tube 8 may be used for the purpose of piercing a hole 9 in the side of the can.

Secured to the end 6 of the bar 5 at the side thereof opposite to the tube 8, and in any suitable manner, is a spout member 10, and the member 10 as shown is provided with a hinge lid 11.

Fitted about the tube 8 for disposition between the end 6 of bar 5 and the adjacent wall of the can 4 is a washer member 12 of rubber, cloth, or any other similar material for the purpose of forming a fluid-tight joint to prevent the liquid within the can from leaking through the opening 17 past the tube 8 and running down the side of the can.

The device also includes a handle 13 which adjacent one end is pivoted between the extension 7 of strap 5 as at 14. Formed integral with the handle 13 at the pivot 14 is a bent perforating point 15 which is of suitable shape to perforate the can wall and remain in an engaged position.

Secured to the plate 5 and extending transversely thereof is a spring clip 16. The clip 16 which is pivoted or otherwise secured intermediate its ends to the strap or plate 5 as at 17 is preferably in the form of an elongated narrow strip of spring metal the respective opposite ends of which are turned downwardly as at 18 to engage the peripheral wall of the can 4 at opposite sides of the can as shown.

From the following description and drawing it will be readily noted that when placing the device on the top of the can 4 and positioning the clip 16 across the top of the can, it is only necessary to place a downward pressure on the handle 13 to cause the piercing tube 8 to enter the can. This provides an outlet for the contents of the same, and the continued downward movement of the handle 13 results in the piercing point 15 entering and ripping a vent opening in the wall of the can opposite to the spout 10, the point 15 retaining its position and serving to hold the handle 13 in the downward position shown in Figure 1 to be conveniently grasped for holding the can 4 incidental to a pouring of the contents of the can.

It is thought that the construction, utility and advantages of an invention of this character will be understood without a more detailed description.

Having thus described the invention what is claimed as new is:—

1. An attachment for a sheet metal can comprising a narrow elongated plate adapted to engage the top of the can, said plate being provided at one end with a downwardly extending projection having an opening, a spout member secured to said downwardly extending projection at one side of the latter in alignment with said opening, a substantially tubular puncturing element secured at one end to said downwardly extending projection at the side thereof opposite to the spout and in alignment with said opening, a pair of spaced parallel co-extensive extensions projecting longitudinally from said plate at the end thereof remote from said projection, a can lifting handle pivoted at one end between said co-extensive extensions, a ripping point integral with said handle at the pivoted end thereof and positioned substantially in parallelism with the handle for movement into and out of position with respect to the can in accordance with the movement of the handle, and said tubular puncturing element and ripping point adapted to puncture the can upon movement of the handle about its pivot to its normal position for holding the can.

2. An attachment for a sheet metal can comprising a narrow elongated plate adapted to engage the top of the can, said plate being provided at one end with a downwardly extending projection, having an opening, a spout member secured to said downwardly extending projection at one side of the latter in alignment with said opening, a substantially tubular puncturing element secured at one end to said downwardly extending projection at the side thereof opposite to the spout and in alignment with said opening, a pair of spaced parallel co-extensive extensions projecting longitudinally from said plate at the end thereof remote from said projection, a handle pivoted at one end between said co-extensive extensions, a ripping point integral with said handle at the pivoted end thereof, and said tubular puncturing element and ripping point adapted to puncture the can upon movement of the handle about its pivot to its normal position for holding the can; and a narrow elongated strap member secured intermediate its ends transversely to said plate and provided at its respective opposite ends with downturned extensions to engage the can at diametrically opposite sides of the latter for retaining said plate in position on the top of the can.

HARRY WARD.
RUDOLPH E. STROM.